United States Patent [19]

Lawrence et al.

[11] Patent Number: 5,129,684
[45] Date of Patent: Jul. 14, 1992

[54] SEALED BULKHEAD FITTING

[75] Inventors: James L. Lawrence; Michael J. Agnes, both of Exton, Pa.

[73] Assignee: Total Containment, Inc., Exton, Pa.

[21] Appl. No.: 787,956

[22] Filed: Nov. 5, 1991

[51] Int. Cl.$^5$ ............................................. F16L 3/04
[52] U.S. Cl. ................................. 285/161; 285/177; 285/192; 285/236; 285/903
[58] Field of Search ............... 285/161, 189, 192, 177, 285/206, 207, 236, 903

[56] References Cited

U.S. PATENT DOCUMENTS

| 393,333 | 11/1888 | Judd . | |
|---|---|---|---|
| 2,464,332 | 3/1949 | Maund et al. | 285/206 X |
| 2,968,840 | 1/1961 | Morse | 18/59 |
| 3,288,164 | 11/1966 | Clark | 137/320 |
| 3,423,518 | 1/1969 | Weagont | 285/161 X |
| 3,749,424 | 7/1973 | Greene | 285/161 |
| 3,873,135 | 3/1975 | Kreitzberg | 285/177 |
| 3,973,789 | 8/1976 | Kunz et al. | 285/39 |
| 4,145,075 | 3/1979 | Holzmann | 285/161 X |
| 4,702,501 | 10/1987 | McLennan | 285/197 |

Primary Examiner—Dave W. Arola
Attorney, Agent, or Firm—Shlesinger Arkwright & Garvey

[57] ABSTRACT

A reducer seal assembly for providing a fluid-tight through-wall fitting. The seal includes a substantially rigid tubular supporting member having a flange extending radially about one edge. The flange and the interior of the supporting member are covered with resilient material. The supporting member is externally threaded so that a nut may be joined thereto. The resilient member coating the flange of the support member may be curved to conform to a convex wall surface. The resilient member extends beyond the supporting member for connection about a conduit extending through the wall. The assembly is connectable to a wall by first inserting the support member through a wall from the exterior side and then the nut is applied to the threaded portion of the support member to the extent that the resilient coating has compressed to form a fluid-tight seal between the coating and the exterior wall surface. A hose clamp is applied about the resilient material extending through the support member for providing a compression fitting against the conduit.

9 Claims, 3 Drawing Sheets

SEALED BULKHEAD FITTING

FIELD OF THE INVENTION

This invention relates to through-wall fittings which prevent fluid flow through the opening surrounding a pipe or conduit extending through the wall.

BACKGROUND OF THE INVENTION

Connection of through-wall fittings which produce a fluid-tight seal between the outer wall of a conduit and a through-wall opening has produced a variety of different pipe connecters and couplings. Some of the connecting structures have been of a permanent variety which include welding or bonding of the exterior wall of the conduit to the wall opening through which the conduit extends. The use of a permanent bond has several disadvantages. First, The wall through which the opening is formed and the conduit itself are usually formed of dissimilar materials which may not be bondable together. Second, the bonding process is generally time consuming and therefore may be expensive to install even though the materials used may be relatively inexpensive.

The preferred variety of connector is that of a compression coupling using elastomeric materials which are joined about the circumference of the conduit and are then connected in a fluid-tight manner to the wall through which the conduit passes.

For example, the coupling structure of Kunz in U.S. Pat. No. 3,973,789 discloses an elastomeric sleeve installed about the through-wall conduit which is compressed by the use of a washer which is threadably connected to the sleeve. While such a connection may be useful in the particular application envisioned by Kunz where a threadable pipe member is used, such a coupling structure is inappropriate for non-threadable materials or in situations where it is not expedient or desirable to cut threads on the pipe material.

In view of the foregoing it can be seen that there is a need for a through-wall coupling which is useful for providing a fluid-tight fitting between a conduit and the walls through which the conduit extends the conduit is unthreaded.

FEATURES AND SUMMARY OF THE INVENTION

One of the most important features of the invention is to provide a through wall fitting for connecting corrugated pipe to the wall opening through which the corrugated conduit or pipe extends.

Yet another feature of the invention is to provide a direct compression clamp to the elastomeric member to engage the wall of the pipe.

Still another feature of the invention is to provide an externally threaded tube having a flange surrounded by resilient elastomeric material wherein the elastomeric material is formed of one piece to be connected directly to the conduit and to engage in a fluid-tight manner the exterior wall of the wall opening surrounding the conduit.

Yet another feature of the invention is to provide a nut for engaging the threaded exterior of the tubular member to compress the elastomeric material surrounding the exterior flange to the exterior wall of the opening surrounding the conduit.

Still another feature of the invention is to provide a bevelled surface on a washer which is complimentary to the interior curved wall so that the compressive force is applied evenly about the edge of the wall opening to ensure a sufficient seal between the resilient member and the outer wall of the opening.

Yet another feature of the invention is to provide an elastomeric washer of a shape which corresponds to a curved wall.

In summary, therefore, the invention is directed to a through-wall fitting including a reducer seal assembly for providing a fluid-tight connection between a conduit and a wall opening through which the conduit extends.

The assembly includes a substantially rigid supporting member having an externally threaded hollow portion through which the conduit extends. The externally threaded portion includes a circumferential flange extending outwardly therefrom. The flange is encased in a resilient member which also extends through the interior of the threaded portion and beyond forming an engagement sleeve for surrounding and being connected to the conduit in a fluid-tight manner. A nut is used to engage the threads of the externally threaded portion.

The through-wall fitting is used by inserting the threaded member through the wall opening from a first side of the wall so that the threaded portion extends through the wall opening beyond the second side of the wall. Thereafter the nut may be applied to the threaded portion and the resilient member is compressed to form a fluid-tight seal between the wall and flange portion of the reducer seal assembly. Next, the conduit is placed in position through the hollow portion of the through-wall fitting and a compression member such as a hose clamp is applied thereto to form a fluid-tight engagement between the reducer seal assembly and the conduit.

The reducer seal assembly may include a curved resilient member joined to the flange portion of the threaded hollow portion to provide a fluid-tight seal on the convex surface of a wall member.

DETAILED DESCRIPTION OF THE DRAWINGS

Figure 1:
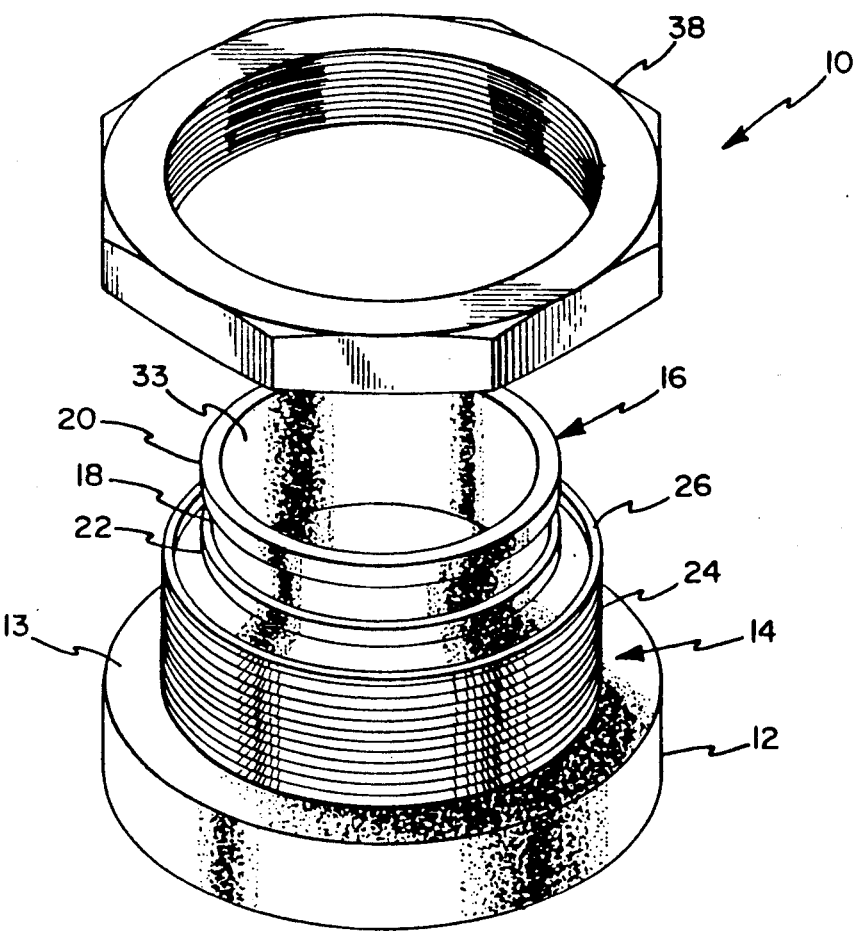
FIG. 1 is a perspective view of the reducer seal assembly.
Figure 2:
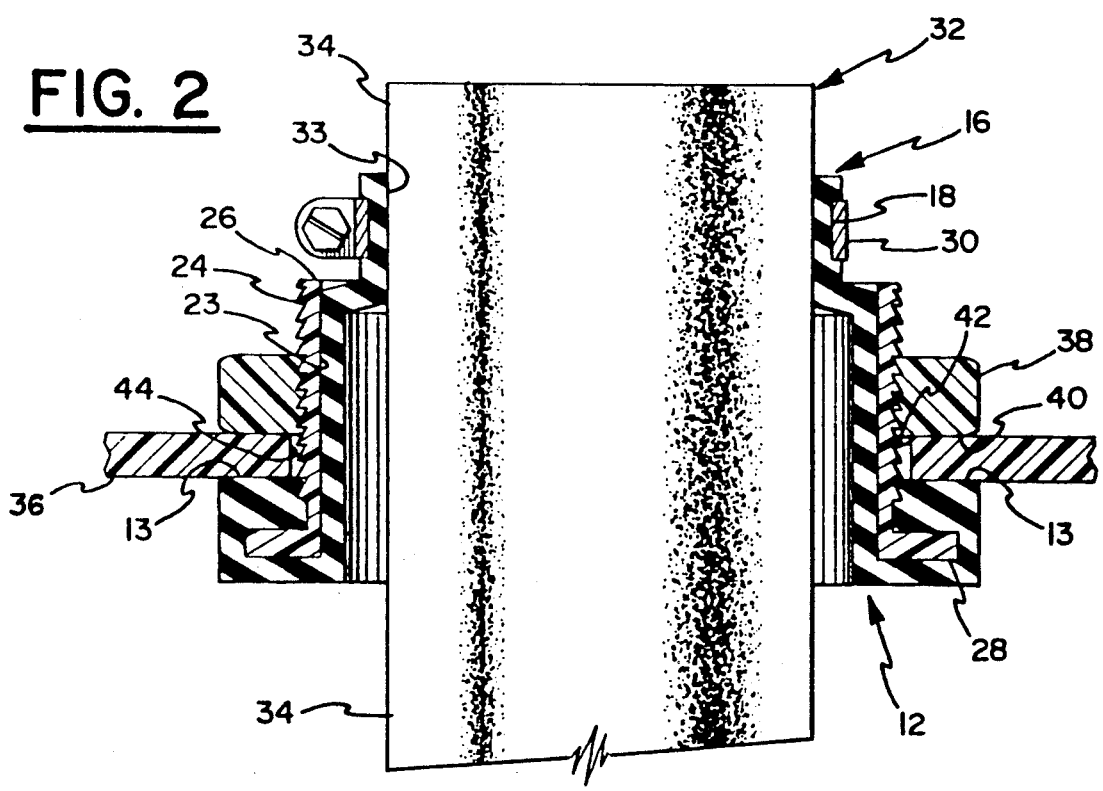
FIG. 2 is a cross-sectional view showing the connection of the reducer seal assembly of FIG. 1 with a conduit and wall opening.

Now referring to FIGS. 1 and 2, a reducer seal assembly 10 is shown having an annular flange 12 of elastomeric material having a fluid-tight wall engaging surface 13. The elastomeric material extends from the annular flange 12 through a rigid tubular sleeve 14 to form a conduit connecting band 16 of reduced diameter. Preferably, connecting band 16 includes a recessed area 18 between the two thicker bands 20 and 22. The rigid tubular sleeve 14 includes generally smooth interior wall 23 and a threaded exterior wall 24 extending from the end edge 26 towards the substantially rigid flange 28.

The cross-section of the reducer assembly of FIG. 1 is shown in FIG. 2 wherein it can be observed that the annular flange 12 encases the substantially rigid flange 28 of the rigid tubular sleeve 14. Flange 28 extends substantially perpendicularly to the rigid tubular sleeve 14 to form a rigid retaining surface about which the resilient material forming the enlarged flange 12 is preferably formed. The resilient material may also be formed separately and then attached to the sleeve 14.

The hose clamp 30 is formed of metal or plastic material and preferably is seated in recess 18 of connecting band 16. The recessed area 18 allows the hose clamp 30 to be connected to the connecting band 16 to provide secure engagement during shipping and handling thereby preventing loss of the hose clamp 30.

When the conduit 32 is in place extending through the reducer assembly 10, then hose clamp 30 is tightened and the resilient connecting band 16 is compressed about conduit 32 and the seal is thereby formed. The connecting band 16 is preferably of a sufficient length and thickness and includes a wall-engaging surface for engaging exterior wall 34 of conduit 32.

The reducer seal assembly 10 is connected to the wall 36 by applying a nut 38. Nut 38 preferably includes a flat edge 40 so that a uniform sealing force is applied at the edge 42 of the opening 44 in side wall 36. Nut 38 is preferably of similar material as rigid tubular sleeve 14. Material such as polypropylene would be generally suitable due to its resistance to petroleum products although metals or other rigid plastics may be used. The resilient member is generally formed of fluid impervious material such as polyetherurethane which is resistant to the effects of petroleum products as well as microbial attack.

Figure 3:
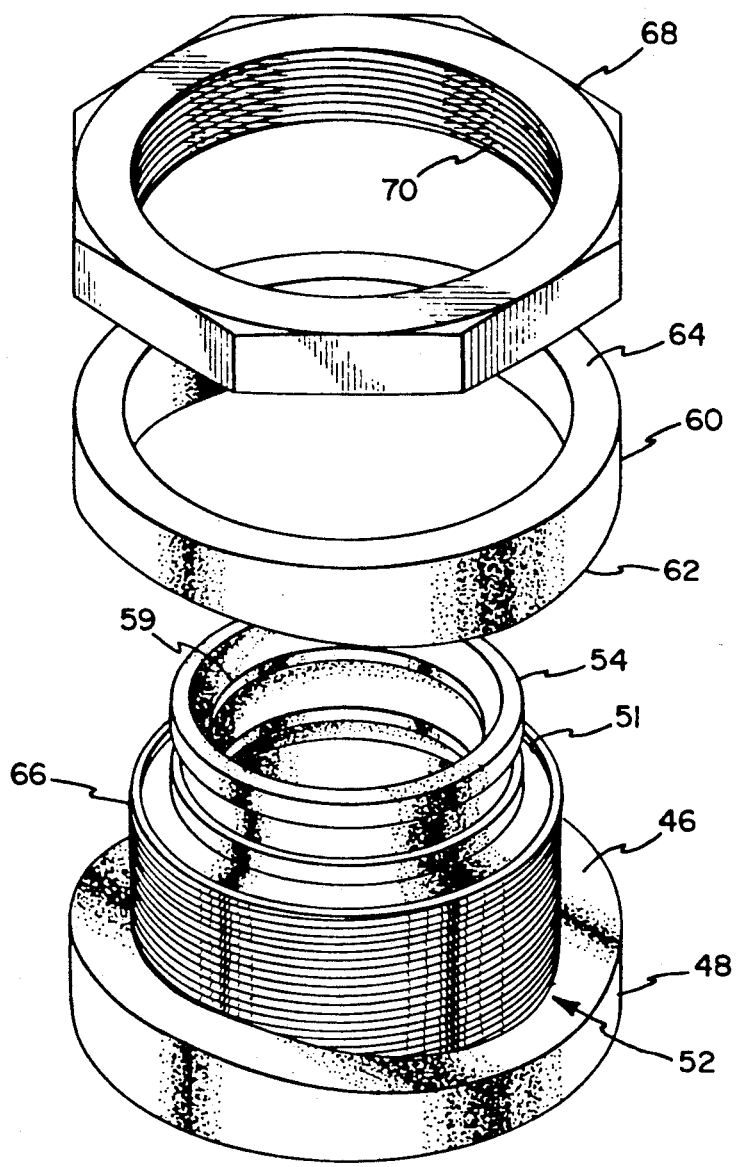
FIG. 3 is a perspective view showing the reducer seal assembly modified for connection to curved wall surfaces.
Figure 4:
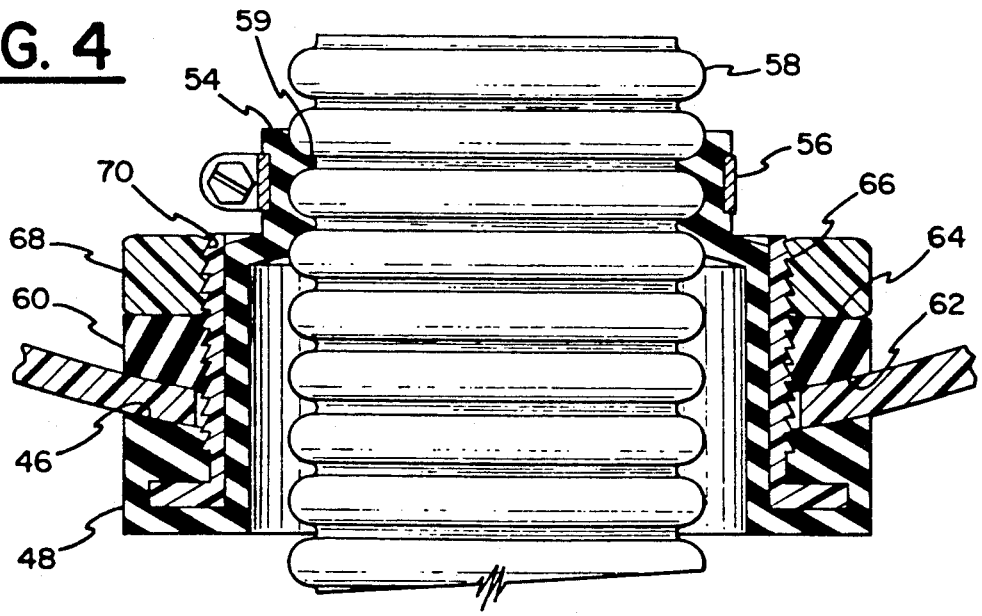
FIG. 4 is a cross-sectional view of the reducer seal assembly of FIG. 3 connected to a curved wall surrounding a conduit extending therethrough; and, FIG. 5 is a cross-sectional view of a sump-riser assembly showing the reducer seal assemblies connecting conduits to the sump-riser housing wall in a fluid-tight manner.

FIGS. 3 and 4 show a reducer assembly which is similar in most respects to that of FIG. 1 except for the concavely curved wall engaging surface 46 on the resilient flange 48. Curved surface 46 allows the resilient flange 48 to conform to a convex wall surface 50 as shown in FIG. 4. The resilient material of the flange 48 extends through the interior 51 of the sleeve 52 and forms a connecting band 54. The connecting band 54 is connectable by a suitable hose clamp 56 to conduit wall 58 to form a fluid-tight seal with the inner surface 59 of connecting band 54. Inner surface 59 may have complimentary connecting ridges for engaging corrugated conduit wall 58. It should be understood that a screwable hose clamp 56 is shown in FIGS. 2 and 4, however, any suitable hose clamp of known construction may be used. A washer 60 having a bevelled surface 62 and a flat surface 64 is located about to the exterior wall 66 of sleeve 52 and a nut 68 is screwed thereon via threads 70 to produce a fluid-tight connecting force between the resilient flange surface 46 and the convex wall 50. Bevelled surface 62 to continuously contacts the wall 50. Nut 68 continuously contacts flat surface 64 so that a uniform connection is formed.

The reducer assemblies are designed for use in underground sump connections such as those used for manholes and underground dual containment gasoline station piping systems.

Figure 5:
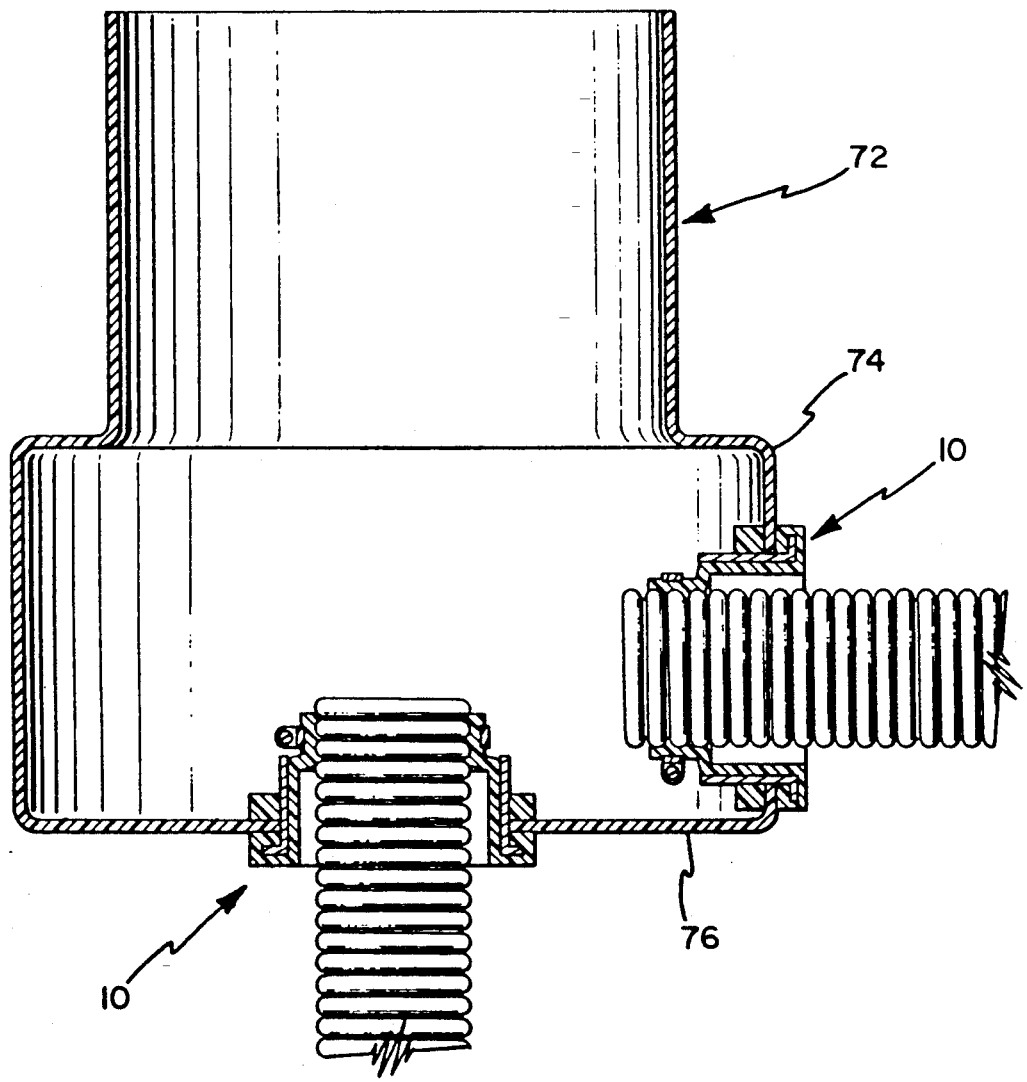

FIG. 5 shows the connection of a conduit to a riser 72 using the reducer assemblies 10. As can be seen the reducer assembly 10 is suitable for use in a side wall 74 connection or a bottom wall 76 connection.

Reducer assembly 10 including the rigid tubular sleeve 14 and resilient flange 12 may be constructed by bonding the resilient material to the rigid tubular sleeve 14 or the resilient material and sleeve may be constructed independently and the resilient material stretched and placed over the rigid tubular sleeve 14 to create the assembly 10.

While this invention has been described as having a preferred embodiment, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

We claim:

1. A reducer seal assembly for providing a fluid-tight through-wall fitting between a fluid impervious wall and a conduit passing through the wall, said assembly comprising:
   a) a substantially rigid supporting sleeve means including an externally threaded hollow portion, said hollow portion having a first open end and a second open end said first end adapted for engaging a wall surrounding an opening and said second end being sized to pass through the opening;
   b) said supporting sleeve means having a lip means for preventing passage of said sleeve means through the wall opening extending substantially perpendicularly outwardly from said first end of said supporting sleeve means;
   c) a resilient member formed about said lip means forming a wall-engaging fluid-tight surface and extending through the hollow portion and beyond said second end to form a clamping band for engaging the through-wall conduit; and,
   d) a threaded fastening means sized for threadably engaging said externally threaded hollow portion.

2. The reducer seal assembly as set forth in claim 1, wherein:
   a) said supporting sleeve means is tubular.

3. The reducer seal assembly as set forth in claim 1, wherein:
   a) said lip means extends entirely about the circumference of said first end and is completely covered by said resilient member.

4. The reducer seal assembly as set forth in claim 1, wherein:
   a) said resilient member is formed of polyetherurethane.

5. The reducer seal assembly as set forth in claim 1, wherein:
   a) said resilient member extends beyond said second end and has a reduced diameter beyond said second end.

6. The reducer seal assembly as set forth in claim 5, wherein:
   a) said resilient member includes a recess for receiving a hose clamp surrounding said reduced diameter.

7. The reducer seal assembly as set forth in claim 1, wherein:
   a) said first open end is of a diameter to receive a secondary containment pipe.

b) said second open end is of a smaller diameter than said first open end.

8. The reducer seal assembly as set forth in claim 1, wherein:

a) said resilient member forms a concave surface to conform to a convex wall.

9. The reducer seal assembly as set forth in claim 1, wherein:

a) said supporting sleeve means and said threaded fastening means are formed of polypropylene.

* * * * *